(12) United States Patent
Benedyk et al.

(10) Patent No.: US 7,227,927 B1
(45) Date of Patent: Jun. 5, 2007

(54) SCALABLE CALL PROCESSING NODE

(75) Inventors: Robby Darren Benedyk, Raleigh, NC (US); Cory Andrew Grant, Apex, NC (US)

(73) Assignee: Tekelec, Morrisville, NC (US)

( * ) Notice: Subject to any disclaimer, the term of this patent is extended or adjusted under 35 U.S.C. 154(b) by 1109 days.

(21) Appl. No.: 09/658,522

(22) Filed: Sep. 8, 2000

(51) Int. Cl.
*H04M 1/24* (2006.01)

(52) U.S. Cl. ............... 379/9.05; 379/112.02; 379/279; 370/237; 370/352

(58) Field of Classification Search ............ 379/229, 379/230, 279, 212.01, 9, 112.01–112.02, 379/215.01, 9.05; 714/4; 455/436; 370/352, 370/237
See application file for complete search history.

(56) References Cited

U.S. PATENT DOCUMENTS

| | | | |
|---|---|---|---|
| 5,933,474 A * | 8/1999 | Kipp ................... | 379/9.05 |
| 6,111,893 A | 8/2000 | Volftsun et al. | |
| H1859 H | 9/2000 | Asthana et al. | |
| 6,118,779 A | 9/2000 | Madonna | |
| 6,122,363 A | 9/2000 | Friedlander et al. | |
| 6,125,111 A | 9/2000 | Snow et al. | |
| 6,205,557 B1 * | 3/2001 | Chong et al. ............ | 714/4 |
| 6,339,594 B1 | 1/2002 | Civanlar et al. | |
| 6,385,193 B1 | 5/2002 | Civanlar et al. | |
| 6,490,451 B1 * | 12/2002 | Denman et al. ........ | 455/436 |
| 6,522,732 B1 * | 2/2003 | Pullen et al. .......... | 379/112.02 |
| 6,563,835 B1 | 5/2003 | Chen | |
| 6,563,918 B1 | 5/2003 | Nelson et al. | |
| 6,570,855 B1 * | 5/2003 | Kung et al. ............ | 370/237 |
| 6,600,738 B1 * | 7/2003 | Alperovich et al. ...... | 370/352 |
| 6,993,011 B1 * | 1/2006 | Kaplan et al. .......... | 370/352 |
| 2001/0046234 A1 | 11/2001 | Agrawal et al. | |
| 2001/0055375 A1 | 12/2001 | Capers et al. | |
| 2002/0027983 A1 | 3/2002 | Suzuki | |
| 2002/0057782 A1 * | 5/2002 | Haruta ................. | 379/212.01 |
| 2002/0071543 A1 | 6/2002 | Williams | |
| 2002/0073288 A1 | 6/2002 | Jeong | |
| 2002/0089940 A1 | 7/2002 | Lee | |
| 2002/0097670 A1 | 7/2002 | Struhsaker et al. | |

OTHER PUBLICATIONS

Arango et al., "Media Gateway Control Protocol (MGCP)," Request for Comments: 2705, Network Working Group, p. 1-124, (Oct. 1999).
Handley et al., "SIP: Session Initiation Protocol," Request for Comments: 2543, Network Working Group, p. 1-111, (Mar. 1999).
Huitema et al., "An Architecture for Residential Internet Telephony Service," IEEE, p. 73-77, (May/Jun. 1999).
Polyzois et al., "From POTS to PANS: A Commentary on the Evolution to Internet Telephony," IEEE, p. 58-64, (May-Jun. 1999).
Simeonov et al., "@INGate: A Distributed Intelligent Network Approach to Bridge Switching and Packet Networks," IEEE, p. 358-363, (1997).

* cited by examiner

*Primary Examiner*—Creighton Smith
*Assistant Examiner*—M. S. Alam Elahee
(74) *Attorney, Agent, or Firm*—Jenkins, Wilson, Taylor & Hunt, P.A.

(57) ABSTRACT

A scalable call processing node includes link interface modules capable of processing n calls per second and call server modules capable of processing m calls per second, n is variable relative to m by changing the relative numbers of call server and link interface modules. In addition, call server modules can perform subsecond switchover when a call server fails without requiring inter-call server transfer of call state information.

18 Claims, 12 Drawing Sheets

SCALABLE CALL PROCESSING NODE

TECHNICAL FIELD

The present invention relates to methods and systems for processing call signaling messages. More particularly, the present invention relates to scalable methods and systems for processing call signaling messages.

RELATED ART

Voice-over-IP technology allows voice and data that was traditionally sent over time division multiplexed (TDM) connections to be sent over an Internet protocol network, such as the Internet. Voice-over-IP communication is desirable because it reduces the need for dedicated circuits between communicating entities. However, providing voice-over-IP communications requires the addition of many components to the conventional public switched telephone network (PSTN).

FIG. 1 is a block diagram of a conventional solution for voice-over-IP-enabling the conventional PSTN network. In FIG. 1, a calling party 100 attempts to establish voice-over-IP communication with a called party 102. Both calling party 100 and called party 102 may utilize conventional PSTN telephones. When calling party 100 dial or keys in the telephone number for called party 102, the dialed digits are sent to service switching point (SSP) 104. Service switching point 104 may be a conventional PSTN end office capable of sending and receiving SS7 call signaling messages over SS7 signaling link 106 and establishing voice communications over TDM voice trunk 108. Signal transfer point (STP) 110 routes call signaling messages to and from SSP 104 over SS7 signaling link 106.

Continuing with the example, signal transfer point 110 routes call signaling messages to SSP 112 through SS7 signaling link 114, STP 116, and SS7 signaling link 118 in order to set up a call with called party 102. SSP 112 conventionally maintains call state information for called party 102 and establishes voice communications between called party 102 and calling party 100 via the TDM voice trunk selected by SSP 104. Thus, in the conventional case, a call can be established between calling party 100 and calling party 102 using only conventional SS7 network elements.

However, in this example, it is assumed that calling party 100 desires to establish a communication with called party 102 via IP connection 122. In order to accomplish this IP connectivity, media gateways 124 include hardware and software for converting between TDM and IP communications. In addition, in order to set up calls using media gateways 124, the network must also include one or more media gateway controllers. In the illustrated embodiment, the network includes six media gateway controllers 126. Media gateway controllers 126 control media gateways 124 via IP links 128 and 130 using any number of media gateway control protocols, such as the media gateway control protocol as defined in Arango et al., RFC 2705, "Media Gateway Control Protocol (MGCP) version 1.0," (October 1999), the Megaco protocol as defined in Cuervo et al., draft-IETF-megaco-merged-01.txt, "Megaco Protocol," (May 2000), or any one of a variety of proprietary and non-proprietary protocols used for controlling media gateways.

Media gateway controllers 126 receive call signaling messages from SSPs 104 and 112 through STPs 110 and 116 and SS7 signaling links 132. Call signaling messages received from SSPs 104 and 112 may be formatted according to the SS7 ISUP protocol. Thus, media gateway controllers 126 each include SS7 and IP communication capabilities.

Conventionally, media gateway controllers 126 have been implemented using stand-alone servers, such as the NETRA™ 1400 available from Sun Microsystems. The NETRA™ 1400 is a server that includes 1-4 Ultrasparc II processors on its motherboard, a 72.8 GB hard drive, a CD-Rom drive, and 4-6 PCI slots. A media gateway controller requires both SS7 and IP network connections. Accordingly, two of the six possible PCI slots may hold Ethernet cards—one for communicating with media gateways and one for an administrative interface. The remaining four slots can hold SS7 cards, each of which is capable of handling two 56 kbps SS7 signaling links. Call processor functions, such as maintaining call state information, are handled by programs executing on the motherboard processors.

A problem with implementing media gateway controllers using stand-alone servers, such as Sun NETRA™ servers, is lack of a reliable way to scale the network. For example, each NETRA™ server is capable of handling at most eight 56 kbps SS7 signaling links. Adding additional SS7 signaling link capabilities requires additional NETRA™ servers. Adding additional NETRA™ servers decreases reliability of the network because of the failure rate caused by hard drives and other components of such servers. In addition, even if redundant NETRA™ servers are used to increase reliability, there is no known mechanism for performing sub-second switchover from one server to a backup server in the event that one server fails.

Another problem with using Sun NETRA™ servers to implement media gateway controller functionality is that inbound SS7 signaling link capacity is less than outbound IP signaling link capacity. For example, conventional SS7 link interface modules may be capable of processing two 56 kbps SS7 signaling links and outbound IP signaling link capacity can be 100 Mbps. This mismatch results in inefficient utilization of outbound signaling link capacity.

In light of all these difficulties associated with conventional media gateway controller solutions, there exists a long-felt need for a scalable and reliable call processing node.

DISCLOSURE OF THE INVENTION

According to one aspect, the present invention includes a scalable call processing node having a plurality of link interface modules for receiving SS7 messages over SS7 signaling links. The link interface modules perform call server selection based on first message parameters in the SS7 messages. The link interface modules are capable of processing at least about n calls per second, where n is an integer. The scalable call processing node also includes a plurality of call server modules. The call server modules receive SS7 messages from the link interface modules and perform call processing operations based on message parameters in the received SS7 messages. The call server modules are capable of handling at least m calls per second, where m is variable relative to n by changing the relative numbers of link interface and call server modules. The call processing node also includes a plurality of transporter modules operatively associated with the call server modules for formulating media gateway compatible messages based on call processing messages and forwarding the media gateway compatible messages to media gateways.

Because the call processing node according to the present invention is scalable, call processing capabilities can be increased or decreased according to network demand. In addition, outbound signaling link capacity can be more efficiently utilized by matching that capacity with inbound signaling link capacity. Finally, due to the absence of multiple mechanical components, such as disk drives, fast switchover capabilities, and decentralized power supplies, the scalable call processing node according to the present invention provides increased reliability over conventional media gateway controller solutions.

Accordingly, it is an object of the present invention to provide a call processing node that is both scalable and reliable.

BRIEF DESCRIPTION OF THE DRAWINGS

A description of preferred embodiments of the present invention will now be explained with reference to the accompanying drawings of which.

DETAILED DESCRIPTION OF THE INVENTION

Scalable Call Processing Node and Operating Environment

Figure 2:
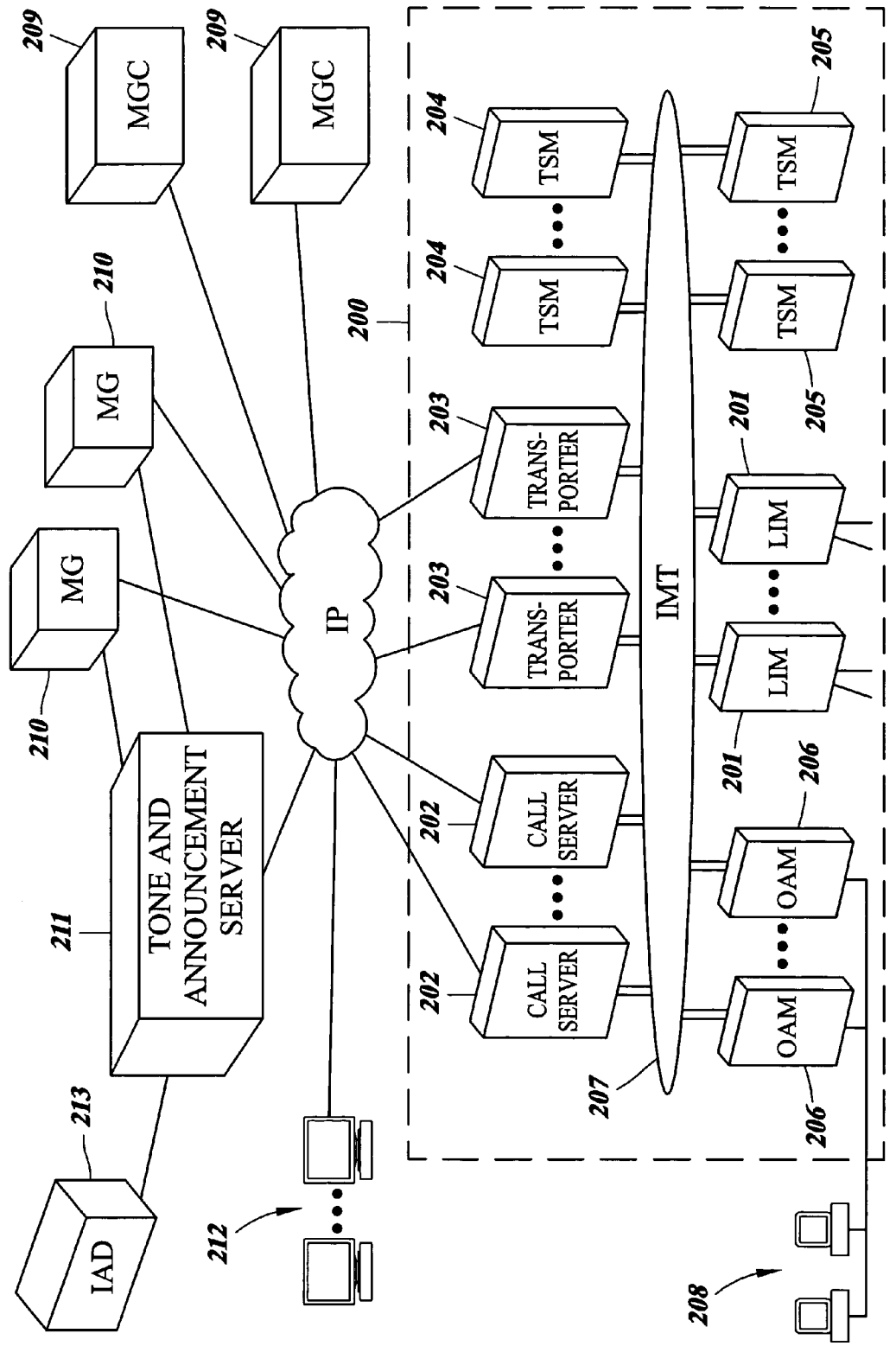
FIG. 2 is a block diagram of a communications network including a scalable call processing node according to an embodiment of the present invention.

FIG. 2 is a block diagram of a scalable call processing node and an exemplary operating environment for such a node according to an embodiment of the present invention.

In FIG. 2, scalable call processing node 200 includes a plurality of cards 201-206 connected to each other via interprocessor message transport (IMT) bus 207. Exemplary cards that may be included in scalable call processing node 200 include link interface modules 201, call server modules 202, transporter modules 203, translation service modules 204 and 205, and operations, administration, and maintenance (OAM) modules 206. Each of these modules will now be explained in more detail.

Link interface modules 201 may comprise SS7 link interface modules. SS7 link interface modules 201 may each include processes for sending and receiving SS7 signaling messages over SS7 signaling links and internally routing SS7 signaling messages based on one or more parameters in the SS7 signaling messages. According to the present invention, link interface modules 201 may also be capable of performing call server selection based on one or more parameters in the received SS7 signaling messages. This function will be explained in more detail below.

Exemplary link interface modules suitable for use with the present invention include two-port link interface modules, eight-port link interface modules, and twenty-four-port ATM link interface modules. Two-port link interface modules are capable of handling two 56 kbps SS7 signaling links. Eight-port LIMs are capable of handling eight 56 kbps SS7 signaling links. Finally, twenty-four-port ATM link interface modules are capable of processing 24 SS7 over ATM signaling links. The hardware associated with such link interface modules may be similar to hardware on LIMs available from Tekelec, Inc., of Calabasas, Calif. (hereinafter, "Tekelec") in the EAGLE® STP or the IP$^7$ SECURE GATEWAY™ products.

Call server modules 202 include processes and databases for performing call control related functions. For example, call server modules 202 may each include one or more databases for performing trunk selection based on parameters in a received ISUP message. Call server modules 202 may also store call state information, such as the sequence of ISUP messages received for a given call. According to an important aspect of the invention with regard to reliability, call server modules 202 preferably replicate call state information of other call servers to allow subsecond switchover in the event of failure of one of the call server modules. This function will be discussed in more detail below.

Transporter modules 203 receive messages from call server modules 202 and translate the messages between SS7 and media-gateway-controller-compatible protocols, depending on whether the destination of a message is an MG, an MGC, or an SS7 network element. For example, transporter modules 203 may each translate between ISUP and one or more of the following protocols:

MGCP, as defined in any one of the above-described IETF or RFC documents;

Session initiation protocol (SIP), as defined in Handley et al., RFC 2543, "SIP: Session Initial Protocol" (March 1999);

Transport adapter layer interface (TALI), as described in, "Transport Adapter Layer Interface 2.0 Technical Reference," Tekelec (May 2000); and Tone and announcement server (TAS), as defined by one or more protocols for communicating with a tone and announcement server.

Translation service modules 204 may include databases and processes for performing number portability translations, such as local or mobile number portability translations. For example, TSM modules 204 may be configured to perform triggered number portability translations in response to TCAP queries received from end offices or triggerless number portability translations in response to ISUP messages received from end offices. Functionality for performed triggered number portability translations is described in "Feature Guide LNP LSMS," PN/910-1598-01, Tekelec, Rev. A (January, 1998). Functionality for performing triggerless number portability is described in U.S. patent application Ser. No. 09/503,541, filed Feb. 14, 2000.

Translation service modules 205 may include databases and processes for translating from national ISUP versions to a universal ISUP protocol. For example, translation service modules 205 may receive messages formatted in Japanese ISUP, ANSI ISUP, or any other national ISUP version. Translation service modules 205 translate the national ISUP versions into a universal ISUP version understood by transporter modules 203 and IP nodes in the IP network. The universal ISUP version is referred to herein as the normalized call control protocol (NCCP). Translation service modules 205 may also include processes and databases for translating between the normalized call control protocol to a national ISUP version. For example, if a normalized call control protocol message is received by translation service modules 205, translation service modules 205 may translate the message to the appropriate national ISUP version based on the destination of the message.

OAM modules 206 allow provisioning and maintenance of the remaining modules of scalable call processing node 200. For example, OAM modules 206 may include serial interfaces for communication with external user terminals 208 to allow provisioning of databases in scalable call processing node 200.

In the embodiment illustrated in FIG. 2, scalable call processing node 200 communicates with a variety of other network entities. For example, in the illustrated example, scalable call processing node 200 communicates with media gateway controllers 209, media gateways 210, tone and announcement server 211, peripheral interface system 212, and integrated access device 213. Each of these elements will now be discussed in more detail.

MGCs 209 control media gateways 210 via one of the media gateway control protocols discussed above. Transporter modules 203 may communicate with MGCs 209 via any suitable protocol, such as ISUP or SIP. Accordingly, MGCs 209 may include functionality for converting from other telephony protocols, such as ISUP or SIP, to the appropriate media gateway control protocol. MGCs 209 also store call state information for setting up and tearing down connections in media gateways 210. An example of an external MGC suitable for use with embodiments of the present invention includes any of the Sun NETRA™-based systems described above.

Media gateways 210 perform the functions of conventional media gateways described above. For example, media gateways 210 translate between circuit-switched and packet-switched communications to allow voice and data communications over an IP network. Media gateways 210 may be controlled by media gateway controllers 209 external to scalable call processing node 200 or by call server modules 202 that are internal to scalable call processing node 200. Exemplary media gateways suitable for use with embodiments of the present invention include the Model No. AS5300 media gateways available from Cisco Systems, Inc.

Tone and announcement server 219 plays tones to telephony users in response to predetermined network conditions. For example, tone and announcement server 219 may play normal busy tones, fast busy tones, and recorded announcements to end users. An exemplary tone and announcement server suitable for use with the present invention includes any of the TAS servers available from Radisys Corporation or Cognitronics Corporation.

Peripheral interface system 220 provides a management network for monitoring communications between the elements illustrated in FIG. 2. For example, peripheral interface system 220 may allow provisioning of databases in any of the elements illustrated in FIG. 2, software updates, CDR generation and analysis, billing, etc. Exemplary peripheral interface system components for CDR collection and analysis include the CDR generator as described in commonly-assigned copending U.S. patent application Ser. No. 09/537,075, filed Mar. 28, 2000, the disclosure of which is incorporated herein by reference in its entirety. Exemplary peripheral interface system components for database provisioning and software updates include a standard server, such as a Java user interface server.

Integrated access device 213 provides end user access to an IP network. For example, integrated access device 213 may allow end user telephone handsets and end user computer terminals to access the IP network. Integrated access device 213 may communicate with tone and announcement server 219 via an ATM signaling link. Integrated access device can be used as a substitute for public branch exchange (PBX) systems used in conventional telephone networks. An exemplary integrated access device suitable for use with embodiments of the present invention is the ClariNet or the Piccolo available from Woodwind Communications.

Scalability

Figure 3:
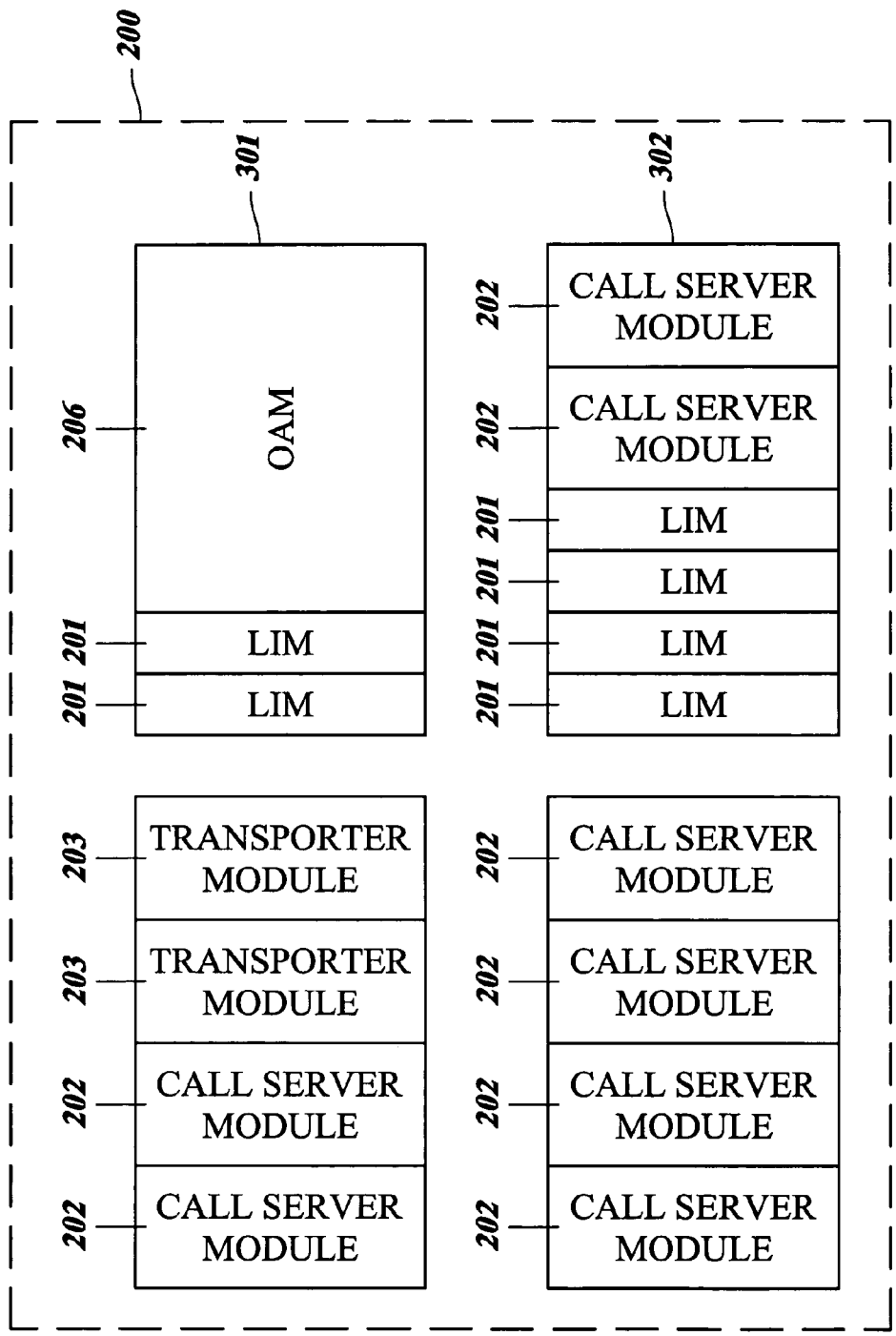
FIG. 3 is a block diagram illustrating the scalability of a call processing node according to an embodiment of the present invention.

FIG. 3 is a block diagram illustrating the scalability of scalable call processing node 200 according to an embodiment of the present invention. In FIG. 3, scalable call processing node 200 includes first and second shelves 301 and 302. Each shelf is a mechanical structure in a telecommunications network equipment housing. Each shelf is capable of holding a plurality of modules or cards. As used herein, the terms "modules" or "cards" refer to printed circuit boards that are removably connectable to IMT bus 207 and that are physically housed in shelves, such as shelves 301 and 302. Scalable call processing node 200 preferably utilizes the same internal architecture with regard to shelves and IMT bus 207 as the EAGLE® STP available from Tekelec. The EAGLE® STP is capable of holding up to 16 shelves with a maximum of 16 cards per shelf. Therefore, like the EAGLE® STP, scalable call processing node 200 is preferably scalable up to 16 shelves per system wherein each shelf is capable of holding up to 16 cards, for a total of $16^2$ or 256 total cards. In the illustrated embodiment, each of the shelves 301 and 302 is capable of housing a maximum of 16 cards.

In the illustrated embodiment, first shelf 301 includes two link interface modules 201, and second shelf 302 includes four link interface modules 201. Thus, the system illustrated in FIG. 3 includes a total of six SS7 link interface modules. For purposes of the present example, it is assumed that each link interface module comprises an eight port LIM capable of handling eight 56 kbps SS7 signaling links. Since SS7 data is transmitted serially, each byte includes eight data bits, plus a start bit and a stop bit, for a total of 10 bits. In addition, for purposes of this example, it is assumed that the ISUP messages required to set up and tear down a call require an average of 500 bytes. Accordingly, the following expression illustrates the incoming call processing capacity of scalable call processing node 200 illustrated in FIG. 3:

$$\text{capacity} = (6 \text{ LIMs})\left(\frac{8 \text{ ports}}{\text{LIM}}\right)\left(\frac{56 \text{ kbits}/s}{1 \text{ port}}\right)\left(\frac{1 \text{ data byte}}{10 \text{ bits}}\right)\left(\frac{1 \text{ call}}{500 \text{ bytes}}\right)(.4) \quad (1)$$
$$= 537.6 \text{ calls/sec}$$

In Equation 1, the number of calls processed by the LIMs illustrated in the scalable call processing node 200 illustrated in FIG. 3 is discounted by a factor of 0.4 since SS7 signaling links are usually only operated at 40% capacity. Thus, LIMs 201 illustrated in FIG. 3 are capable of handling 537 calls per second.

Scalable call processing node 200 illustrated in FIG. 3 includes eight call server modules 202 for performing call server functions. Each call server module may be capable of handling a maximum of from about 100 to about 400 calls per second using currently available call server hardware, which will be discussed in more detail below. Thus, since scalable call processing node 200 includes eight call server modules, and each call server module is capable of processing from about 100 to 400 calls per second, the call server processing capacity of scalable call processing node 200 is from about 800 calls per second to about 3200 calls per second. A call processing capability of 3200 calls per second greatly exceeds the capacity of any media gateway controller presently known. For example, in a press release dated Aug. 2, 2000, Sonus Networks claimed that their PSX6000™ soft switch achieved 1650 calls per second in network tests. This is the highest number presently know and can be greatly exceeded by a scalable call processing node according to the present invention.

Finally, scalable call processing node 200 includes two transporter modules 203 for sending messages to the media gateway controllers. Since transporter modules send messages over IP signaling links and are not required to maintain call state information, the transporter modules are typically not a bottleneck to system call processing performance. For example, using currently available Ethernet-based data communication modules available from Tekelec, transporter modules 203 are each capable of sending messages at a rate of about 100 Mbps, which results in a total call processing capacity of 20,000 calls per second.

The present invention is not limited to the embodiment illustrated in FIG. 3. FIG. 3 simply illustrates a two-shelf system capable of handling about 537 calls per second. As stated above, using the currently available EAGLE® architecture, one call processing node can have up to 16 shelves having a maximum of 16 cards or modules per shelf. Such a system could include up to 256 cards including six OAM cards 206. Accordingly, an alternative embodiment of the invention may include 83 eight port LIMs, for a total inbound call processing capacity of 3000 calls per second. In such an embodiment, at least eight 400 call-per-second call server modules may be included to handle the incoming calls. Finally, one transporter module may be included to provide the required outbound call translation rate. Thus, scalable call processing node 200 may be capable of processing 3000 or more calls per second, simply by adding additional call server and link interface modules. Proof of the call processing capability is illustrated by the following equations:

$$\frac{\text{inbound}}{\text{capacity}} = (83 \text{ LIMs})\left(\frac{8 \text{ ports}}{\text{LIM}}\right)\left(\frac{56 \text{ kbits}/s}{1 \text{ port}}\right)\left(\frac{1 \text{ data byte}}{10 \text{ bits}}\right)\left(\frac{1 \text{ call}}{500 \text{ bytes}}\right)(.4) \quad (2)$$
$$= 3000 \text{ calls/sec}$$

$$\frac{\text{call server}}{\text{capacity}} = (8 \text{ call servers})\left(\frac{400 \text{ cps}}{1 \text{ call server}}\right) \quad (3)$$
$$= 3200 \text{ calls/sec}$$

The call processing capability of a transporter module ranges from about 3000 to about 10,000 calls per second. In a preferred embodiment of the invention, the number of transporter modules for a given anticipated call volume is preferably doubled for load sharing and failover capabilities. Thus, if the required number of transporter modules for a given anticipated call volume is n, the number of transporter modules is preferably 2n.

Thus, it is apparent from equations (2) and (3) that the call processing capabilities of scalable processing node 200 can be extended to 3000 or more calls per second.

Module Hardware

Figure 4:
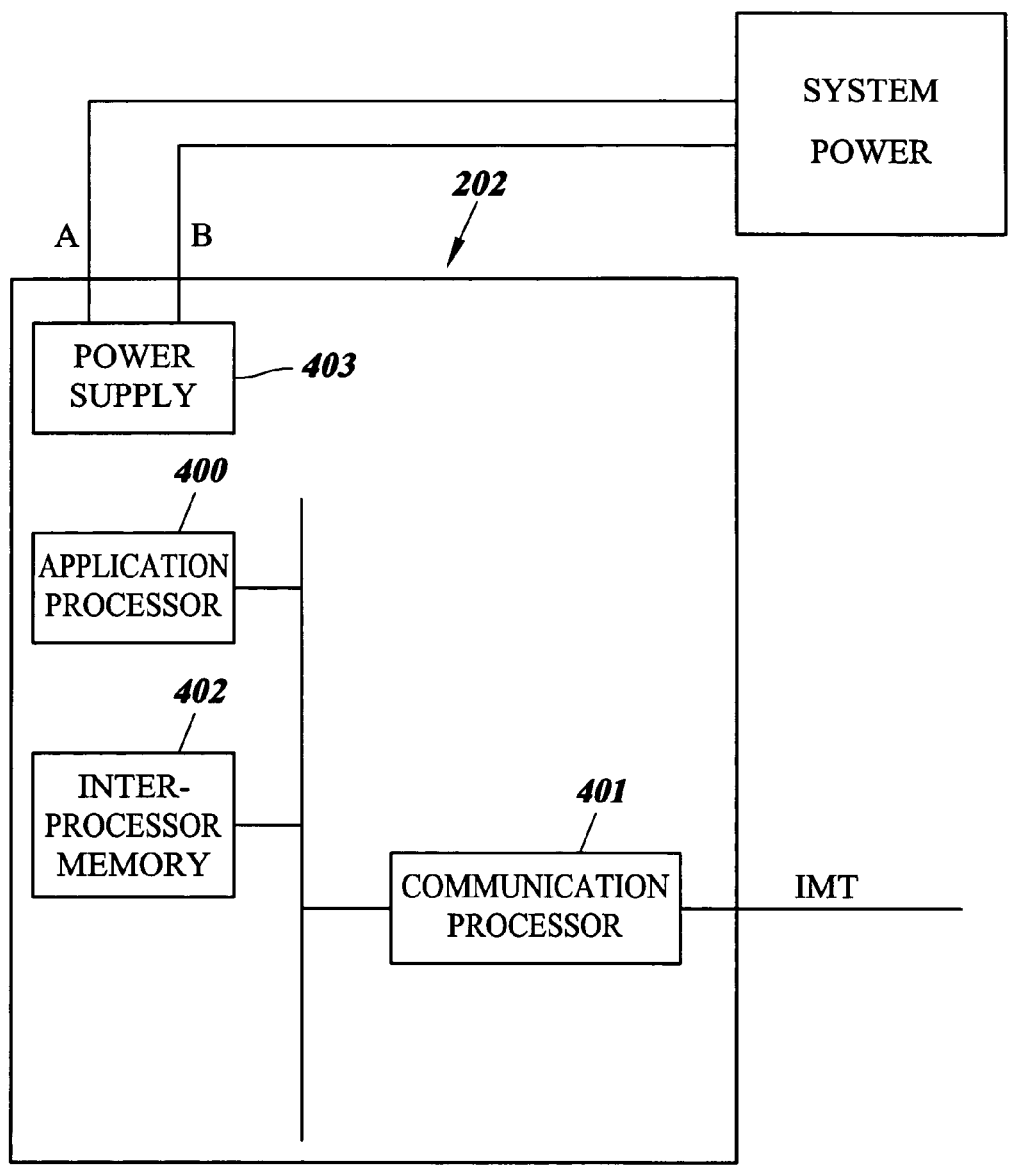
FIG. 4 is a block diagram of exemplary call server module hardware according to an embodiment of the present invention.

FIG. 4 is a block diagram of exemplary module hardware suitable for use for LIMs 201, call server modules 202, and transporter modules 203 according to an embodiment of the present invention. For purposes of explanation, FIG. 4 illustrates exemplary hardware for a call server module 202. Hardware for other modules is similar to that illustrated in FIG. 4. In FIG. 4, call server module 202 includes application processor 400, communication processor 401, and interprocessor memory 402.

Application processor 400 executes programs for performing call processing operations, such as storing call state information, formulating call processing messages in response to other call processing messages received from communication processor 401. Communication processor 401 sends and receives messages via IMT bus 207. Interprocessor memory 402 is shared by application processor 400 and communication processor 401. Because processors 400 and 401 utilize shared memory, the efficiency of call processing module 202 is increased. An exemplary commercially available microprocessor suitable for use as application processor 400 is the K6-2 available from AMD Corporation. An exemplary microprocessor suitable for use as communication processor 401 is the K6-2 available from AMD Corporation.

In the illustrated embodiment, call server module 202 preferably includes its own power supply 403. Such a power supply may be configured to provide power to processors 400 and 401 and memory 402, as well as other circuitry of call server module 202. Power supply 403 preferably received its power from a system power supply, which is preferably an uninterruptible power supply (UPS). Any suitable commercially available power supply for providing power at logic levels can be used for power supply 403. What is important for purposes of the present invention is that each call server module preferably includes its own power supply. Thus, if one power supply fails, only one call server module will fail. This is in contrast to the conventional solution where media gateway controllers are implemented by Sun NETRA™ servers. In those systems, if the power supply fails, all of the media gateway controller functionality of that system fails.

Subsecond Switchover

Figure 5:
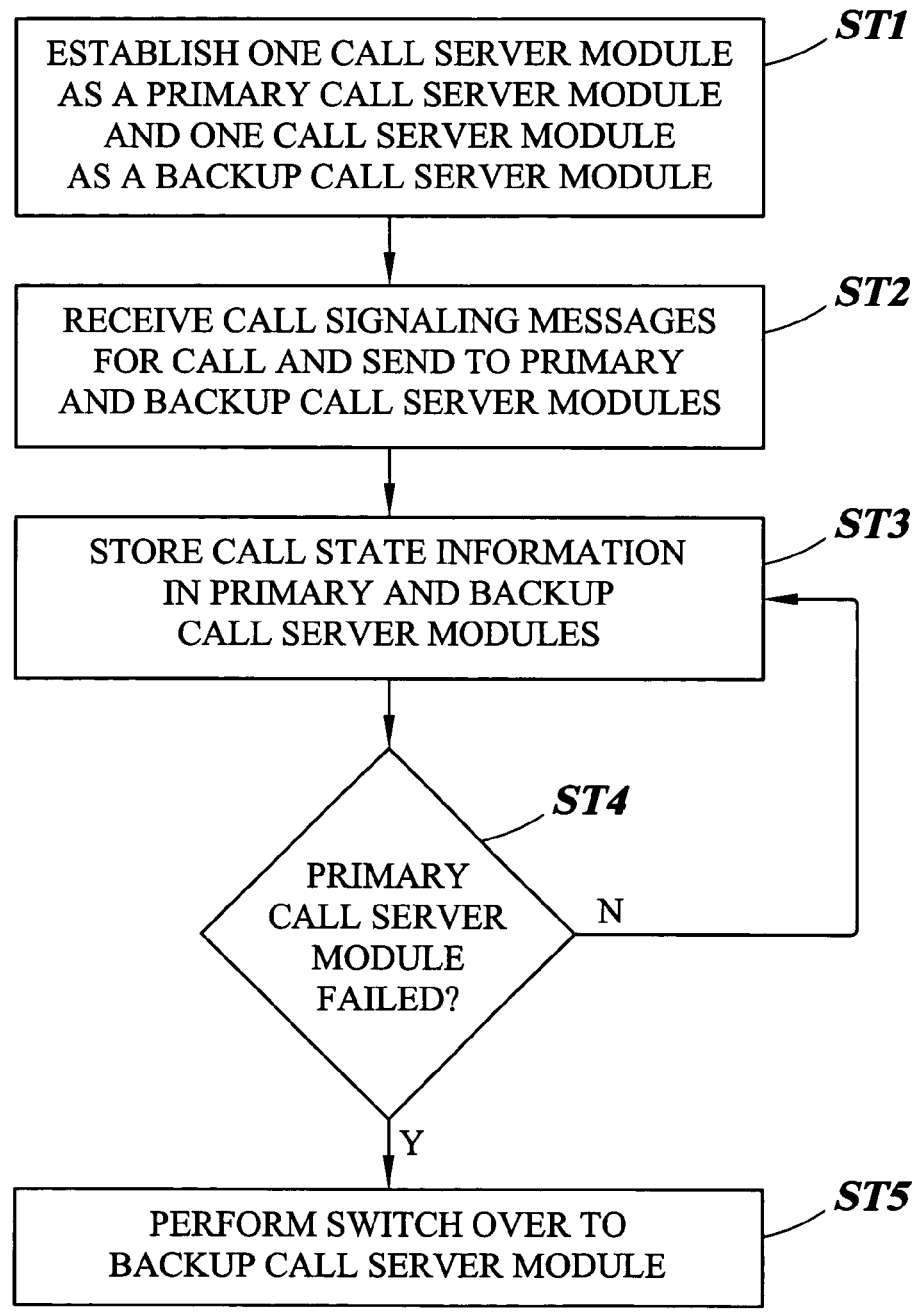
FIG. 5 is a flow chart illustrating exemplary steps that may be performed by call server modules in performing call server switchover according to an embodiment of the present invention.

According to another aspect, the present invention includes methods and systems for performing subsecond switchover of call servers in the event that one call server fails. FIG. 5 illustrates exemplary steps that may be performed by a call processing node according to an embodiment of the present invention in performing subsecond switchover. Referring to FIG. 5, in step ST1, scalable call processing node 200 establishes one call server module as a primary call server module and another call server module as a backup call server module. The decision as to whether a call server will be a primary or a backup module may depend on any suitable criteria, such as the memory address at which the call server software is located. For example, the call server software having the lowest memory address may be designated the primary call server module.

Figure 1:
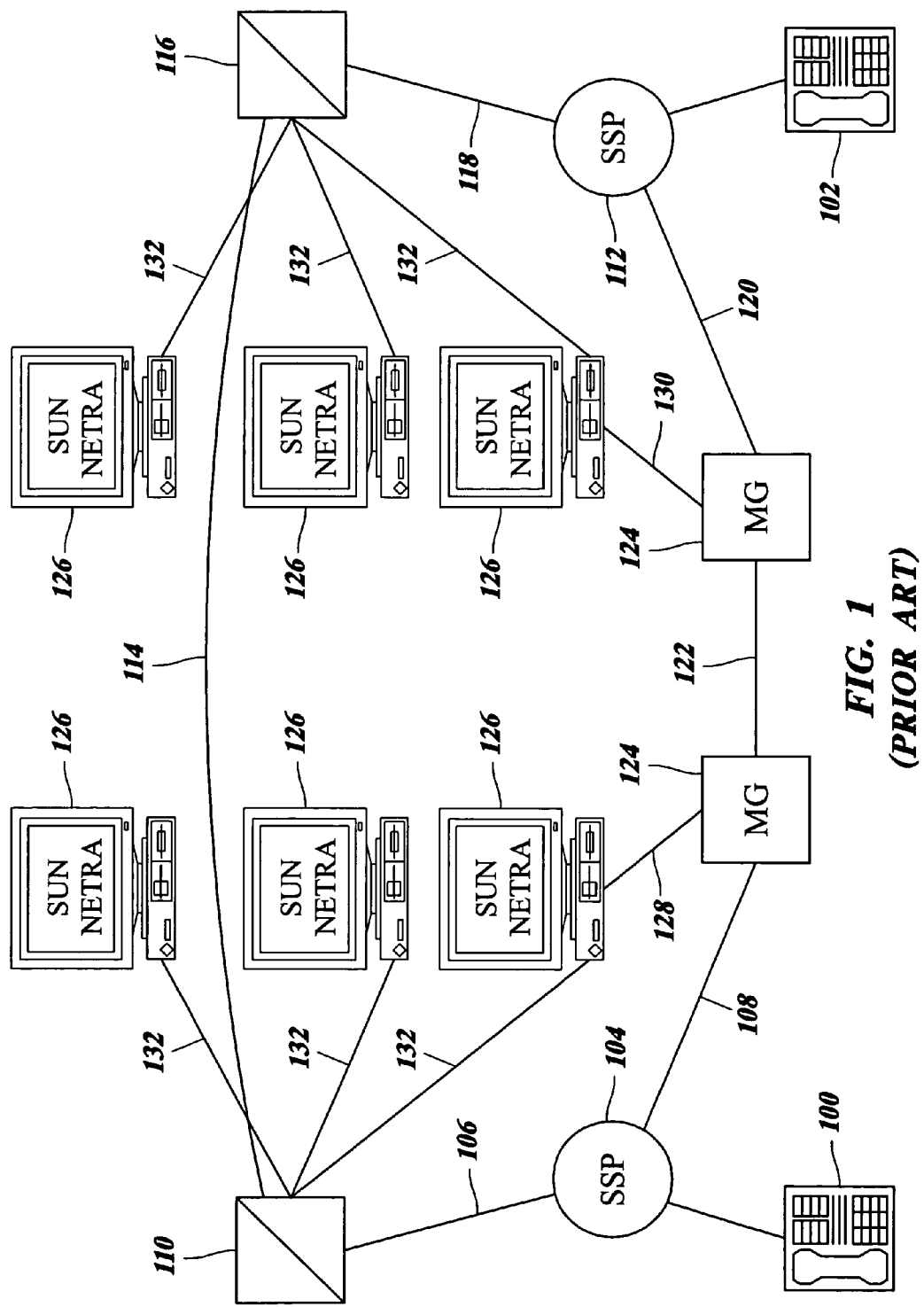
FIG. 1 is a block diagram of a conventional communications network in which media gateway controllers are implemented by Sun NETRA™ servers.

In step ST2, one of the LIMs 201 illustrated in FIG. 1 receives call signaling messages for a call and sends the call signaling messages to the primary and backup call server modules. For example, each LIM may make a copy of the original message and send the original along with the copy to two different call server modules. In an alternative embodiment, each LIM may send the original message to the primary call server and the primary call server may send a copy to the backup call server. In step ST3, the primary and backup call server modules each store state information for the call. In this context, state information includes any information required to set up, maintain or tear down a call, such as messages received, trunk information, linkset information, media gateway endpoint information, etc. Exemplary call state information that may be replicated in primary and backup call server modules will be described in more detail below with regard to FIG. 7.

Although both call servers store the call state information, only the primary call server module actually sends call signaling messages related to the call to outbound communications modules. In step ST4, the backup call server module determines whether the primary call server module has failed. Referring back to FIG. 4, this determination may be made by communication processor 401 associated with the secondary call server. For example, communication processor 401 of the backup call server may monitor a heartbeat message from the communication processor of the primary call server. If the heartbeat message fails to arrive within a predetermined time period, communication processor 401 of backup call server module may notify application processor 400 of the backup call server of the failure of the primary call server module. In step ST5, application processor 400 of the backup call server module switches to perform primary call server functions, such as sending the appropriate call signaling messages to a media gateway to set up a connection in the media gateway.

Thus, as illustrated in FIG. 5, switchover may occur between call sever modules connected to the IMT bus. Because the primary and backup call server modules each receive copies of all of the call signaling messages associated with a call, because both call servers retain call state information for the call, and because the call servers are connected to a high-speed IMT bus, subsecond switchover of call servers can be achieved. Unlike the prior art where it is necessary to transfer call state information from one media gateway controller to another media gateway controller when one media gateway controller fails, this transfer is not necessary in the present embodiment. Communications can resume without transfer of call state information due to the redundant storage thereof by call server modules according to an embodiment of the present invention.

Scalable Call Processing Node Internal Architecture and Message Flow

Figure 6:
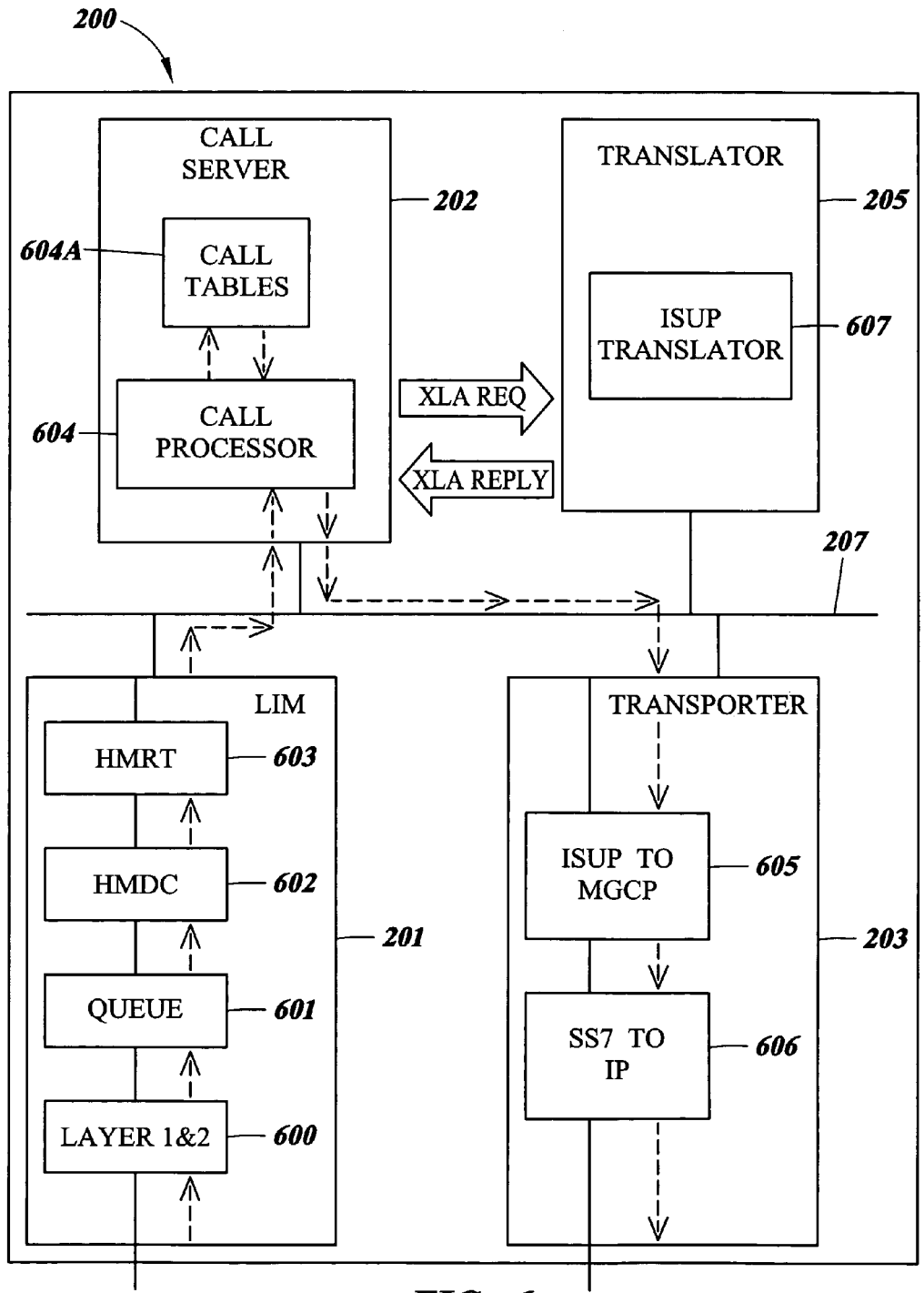
FIG. 6 is a block diagram illustrating message flow through a scalable call processing node according to an embodiment of the present invention.

FIG. 6 is block diagram illustrating internal architecture and message flow for a scalable call processing node according to an embodiment of the present invention. For purposes of illustration, it is assumed that the incoming message is an ISUP message and the outgoing message is a media-gateway-compatible message.

In FIG. 6, scalable call processing node 200 includes LIM 201, call server module 202, transporter module 203, translator module 205, and IMT bus 207. It is understood that although scalable call processing node 200 includes a single LIM, call server, translator, and transporter module, any number of these modules may be included within the scalable call processing node 200. One module of each type is shown to simplify the explanation of the message flow.

LIM 201 includes SS7 layer 1 and 2 process 600 for performing SS7 layer 1 and 2 functions on incoming messages. I/O queue 601 stores messages for processing by higher SS7 layer processes. Message handling and discrimination (HMDC) process 602 performs discrimination of incoming messages to determine whether the messages are addressed to scalable call processing node 200 or whether the messages should be through-switched. Such a determination may be made based on a destination point code value in the incoming SS7 messages. Message handling and routing (HMRT) process 603 internally routes messages that are directed to scalable call processing node 200. According to the present invention, HMRT process 603 may be provisioned to perform call server selection based on one or more parameters in the SS7 call signaling messages. Exemplary parameters that may be used to perform call server selection are the OPC, DPC, and CIC codes in an incoming SS7 message.

Figure 7:
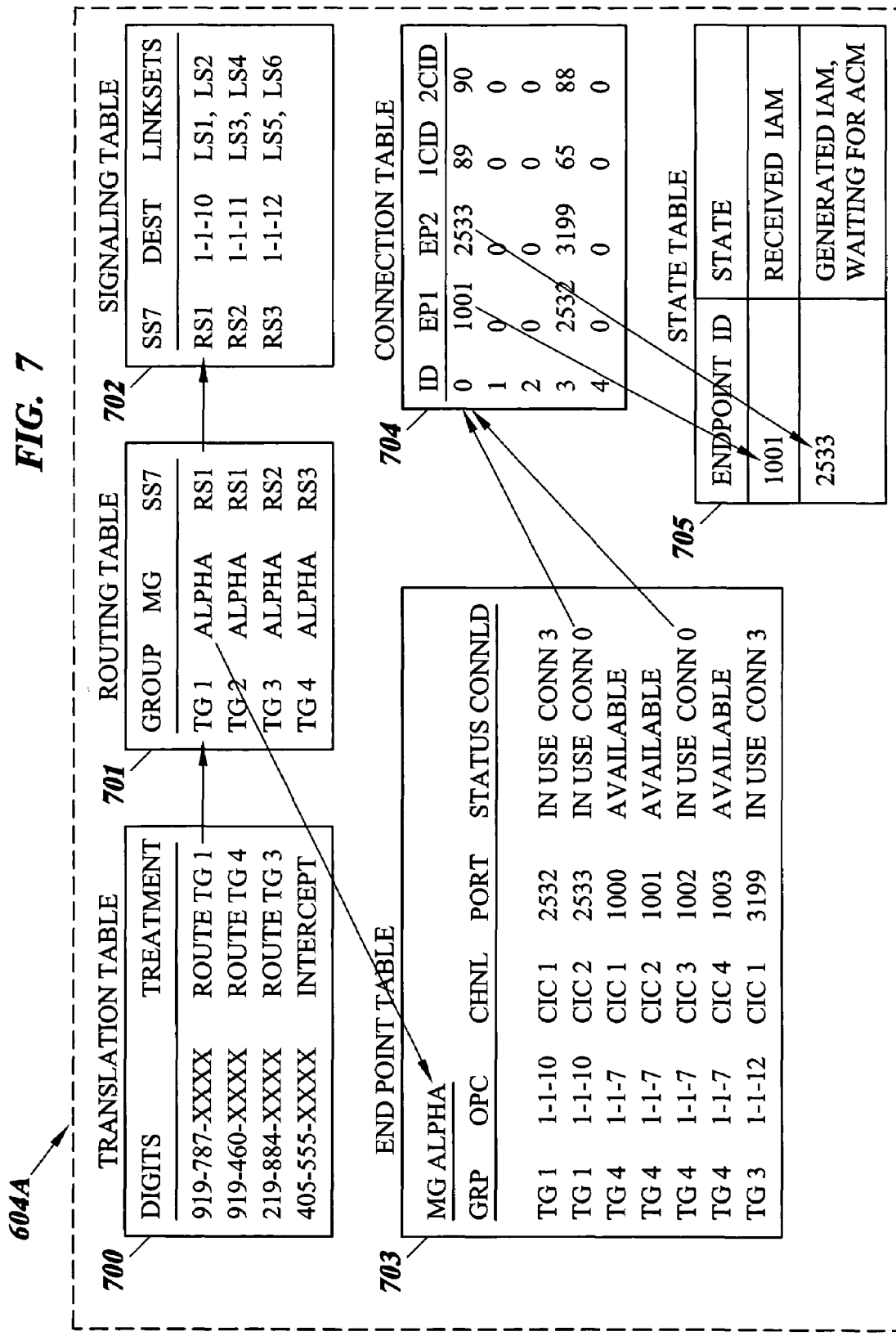
FIG. 7 is a block diagram illustrating exemplary call tables used by a call server module according to an embodiment of the present invention.

Call server module 202 includes call processor 604 and one or more call tables 604A for maintaining call state information and setting up a connection using a media gateway. FIG. 7 illustrates exemplary call tables 604A that may be stored in memory on call server module 202. Referring to FIG. 7, call tables 604A include a translation table 700, a routing table 701, a signaling table 702, an endpoint table 703, a connection table 704, and a state table 705. Each of these tables may be variously configured. In the illustrated embodiment, translation table 700 maps dialed digits to trunk groups. Routing table 701 maps trunk groups to media gateways and SS7 routing sets. Signaling table 702 maps SS7 routing sets to destination point codes and linksets. Routing table 701 and signaling table 702 are used to generate SS7 call signaling messages relating to a call. Endpoint table 703 and connection table 704 contain information for establishing a connection in a media gateway. Finally, state table 705 stores call state information for each endpoint in a media gateway. The use of tables 700-705 to set up a call will now be described in more detail.

Figure 8:
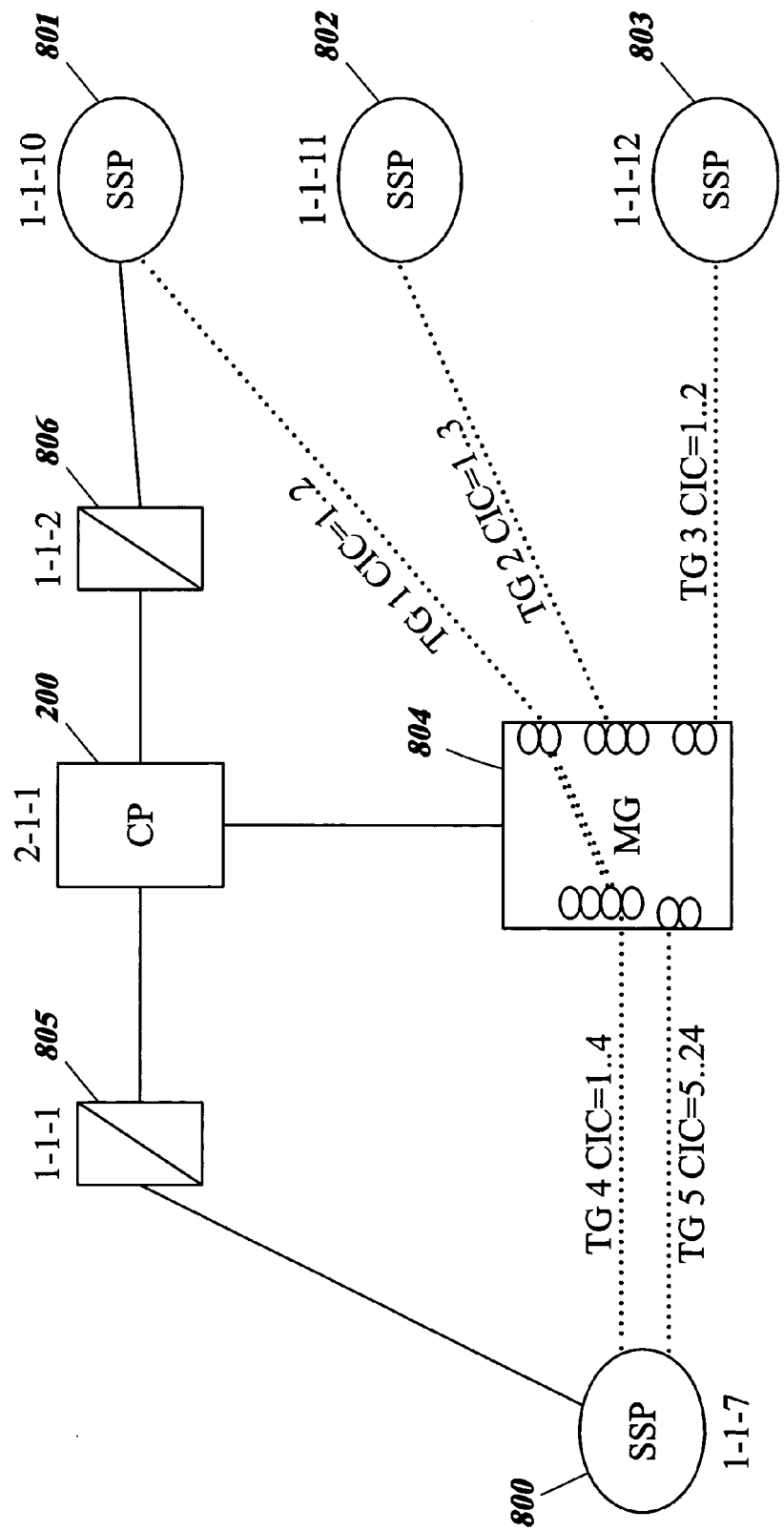
FIG. 8 is a block diagram illustrating trunking and media gateway connections set up by a scalable call processing node according to an embodiment of the present invention.

FIG. 8 illustrates exemplary trunking and connections in a voice-over-IP network including a scalable call processing node according to an embodiment of the present invention. In FIG. 8, end office 800 is connected to end offices 801-803 by media gateway 804. More particularly, trunk groups 4 and 5 connect end office 800 to media gateway 804 and trunk groups TG1-TG3 connect media gateway 804 to end offices 801-803. Each trunk group includes a plurality of channels, which are identified by CIC codes unique to each end office. STPs 805 and 806 route call signaling messages between end office 800 and end office 801. Finally, scalable call processing node 200 sets up, maintains, and tears down connections in media gateway 804.

Figure 9:
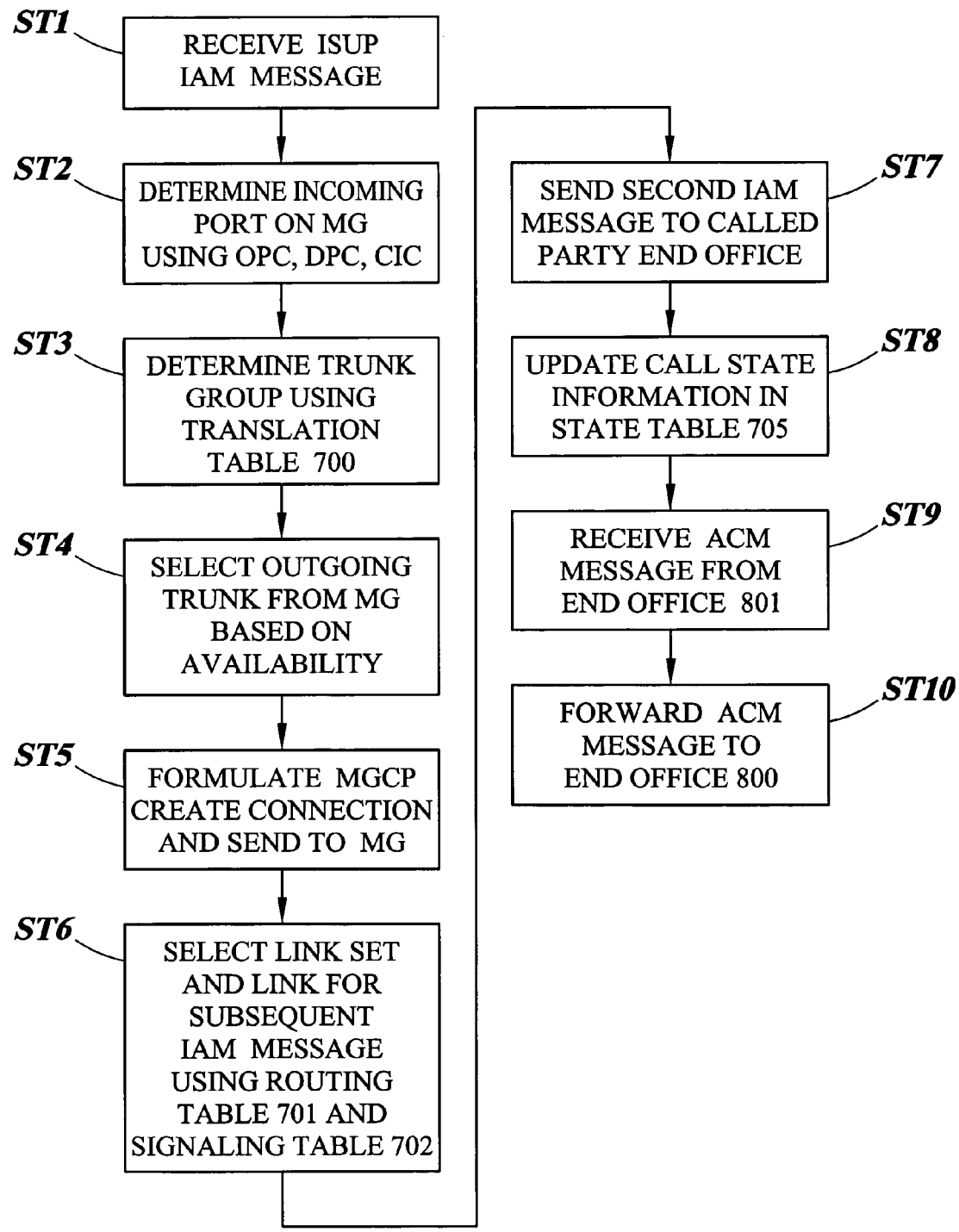
FIG. 9 is a flow chart illustrating exemplary call processing operations performed by a scalable call processing node using the call tables illustrated in FIG. 7.

FIG. 9 illustrates exemplary steps that may be performed in setting up a call between an end user connected to end office 800 and another end user connected to end office 801 illustrated in FIG. 8 using call tables 604A illustrated in FIG. 7. Referring to FIG. 9, in step ST1, scalable call processing node 200 receives an ISUP IAM message from end office 800. The parameters in the ISUP IAM message may be as follows:

OPC=1-1-7, DPC=2-1-1, CIC=3, ClgPty=919460-5500, CldPty=919-787-8009.

In step ST2, scalable call processing node 200 determines the incoming port on media gateway 804 using the OPC, DPC, and CIC codes in the message. In this example, it is assumed that the incoming port number corresponding to the OPC, DPC, CIC combination is 1002. In step ST3, call processing node 200 determines a trunk group for the outgoing trunk using the called party number and translation table 700 in FIG. 7. In FIG. 7, translation table 700 indicates that the called party digits 919-787-xxxx corresponds to trunk group TG1.

In step ST4, scalable call processing node 200 selects an outgoing trunk in trunk group 1. This selection may be performed by choosing the next available circuit within the trunk group. In this example, it is assumed that the trunk corresponding to CIC code 2 is the first available trunk in the trunk group. In step ST5, scalable call processing node 200 formulates an MGCP CreateConnection message and sends the message to the media gateway. This message may be formulated by transporter module 703 illustrated in FIG. 6 based on parameters received from call server module 202. In order to determine the parameters that must be included in the CreateConnection message, call server module 202 may access endpoint table 703 illustrated in FIG. 7. In this example, since the trunk group is TG1, the OPC is 1-1-10, and the CIC code is 2, the outgoing port on media gateway 804 is port number 2533. The connection ID assigned to the connection in media gateway 804 is 0. Accordingly, scalable call processing node 200 formulates an MGCP CreateConnection message with the following parameters:

ID=0, EP_ID=1002, SEC EP_ID=2533.

In response to the MGCP CreateConnection message, media gateway 804 returns connection identifiers corresponding to each end of the connection in media gateway 804. In this example, the connection identifier for the first endpoint is assumed to be 89 and the connection identifier corresponding to the second endpoint of the connection is 90. These parameters are stored in connection table 704 illustrated in FIG. 7.

In step ST6, scalable call processing node 200 determines data to be included in an IAM message sent out to end office 801 to select the outgoing trunk between end office 801 and media gateway 804. In order to make this determination, scalable call processing node 200 uses routing table 701 and signaling table 702 illustrated in FIG. 7. Referring to routing table 701, if the trunk group is TG1, the SS7 routing set is RS1. Referring to signaling table 702, if the routing set is RS1, the destination point code is 1-1-10, and the linksets are LS1 and LS2. In step ST7, scalable call processing node 200 sends the IAM message to end office 801. In this example, the parameters that may be included in the IAM message are:

OPC=2-1-1, DPC=1-1-10, CIC=2, ClgPty=919-460-5500, CldPty=919-787-8009.

The IAM message instructs end office 801 to set up a trunk corresponding to CIC code 2.

In step ST8, scalable call processing node 200 updates call state information in state table 705. State table 705 preferably contains an entry for each endpoint. In the illustrated example, the endpoint corresponding to port 1001 in media gateway 804 is in the state received IAM, indicating that an IAM message has been received for that endpoint. Endpoint ID 2533 is in the state generated IAM and waiting for ACM. Step ST8 is preferably performed any time a message relating to a connection is sent or received. The state information stored in table 705 is not to be confused with the state information exchanged between primary and backup media gateways described above with respect to FIG. 7, which may include any or all of the information contained in call tables 604A.

In step ST9, scalable call processing node 200 receives an address complete message from end office 1-1-10. In step ST10, scalable call processing node 200 forwards the address complete message (ACM) to end office 800. When the called party answers the call, an answer (ANM) message is sent from end office 801 through scalable call processing node 200 to end office 800. The ANM message follows the same path as the ACM message. Once the ANM message is received, a voice connection is established between end office 800 and end office 801 through media gateway 804. Thus, FIGS. 7-9 illustrate the use of call tables 604A in setting up a call using a media gateway.

Referring back to FIG. 6, transporter module 203 includes upper layer protocol converter 605 for converting between SS7 and a media-gateway-compatible or media-gateway-controller-compatible protocol, such as MGCP, SIP, or any of the other protocols discussed above. Transporter module 203 also includes SS7-to-IP converter 606 for converting between SS7 and IP address schemes. Finally, translator module 205 includes ISUP translator 607 for converting from national to normalized ISUP and vice versa.

Figure 10:
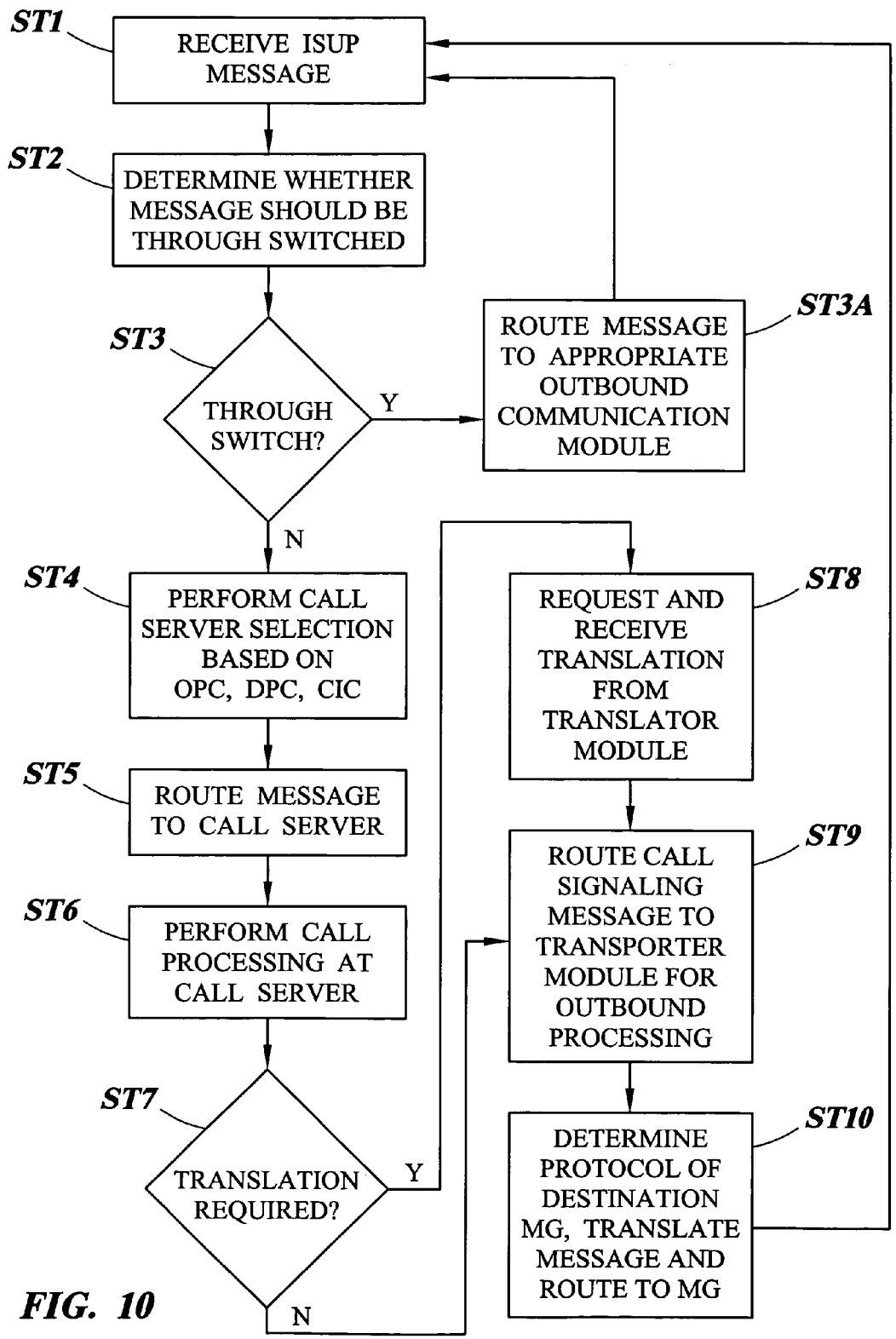
FIG. 10 is a flow chart illustrating routing decisions made by a scalable call processing node according to an embodiment of the present invention.

The internal operation of scalable call processing node 200 illustrated in FIG. 6 will now be explained with reference to the flow chart illustrated in FIG. 10. In FIG. 10, in step ST1, LIM 201 receives an ISUP message. Such a message may be an initial address message (IAM), an address complete message (ACM), an answer message (ANM), a release message (REL), or a release complete message (RLC). In this example, it is assumed that an IAM message is received. In step ST2, LIM 201 illustrated in FIG. 6 determines whether the message should be through-switched. As stated above, this determination may be made based on the destination point code in the message. In step ST3A, if the message is to be through-switched, HMDC process 602 in LIM 201 routes the message to the appropriate module for outbound processing. In this example, it is assumed that the message is not a message that is to be through-switched.

In step ST4, HMRT process 603 in LIM 201 performs call server selection based on the OPC, DPC, and CIC parameters in the received SS7 message. In step ST5, HMRT process 603 routes the message to the appropriate call server. In step ST6, call processor 604 performs call processing operations in response to the received SS7 message. Exemplary call processing operations that may be performed include the operations relating to setting up a connection in media gateway 804 described with respect to FIGS. 7-9.

An additional function that may be performed by call processor 604 is determining whether translation is required. As used herein, translation refers to translation to or from a normalized ISUP protocol. In order to make this determination, call processor 604 may determine the ISUP protocol used by the called party end office based on one or more parameters, such as DPC, in the received ISUP message. In step ST8, if translation is required, call processor 604 may forward the message to ISUP translator 607, where a translation is performed, and receive a translated message from translator 607.

In step ST9, call processor 604 routes either the translated or the non-translated call signaling message to transporter module 203 for outbound processing. In step ST10, upper layer transport module 605 determines the protocol of the destination media gateway and translates the upper layer portion of the received message to the upper layer protocol of the destination. For example, upper layer transport module may translate the message from ANSI ISUP to MGCP. Lower layer transport processor 606 converts the lower level portion of the message to Internet protocol. Transporter module 203 then routes the message to an appropriate media gateway. Thus, FIG. 7 illustrates internal routing decisions performed by scalable call processing node 200.

Call Setup Using Media Gateway Controllers and Scalable Call Processing Node

Figure 11:
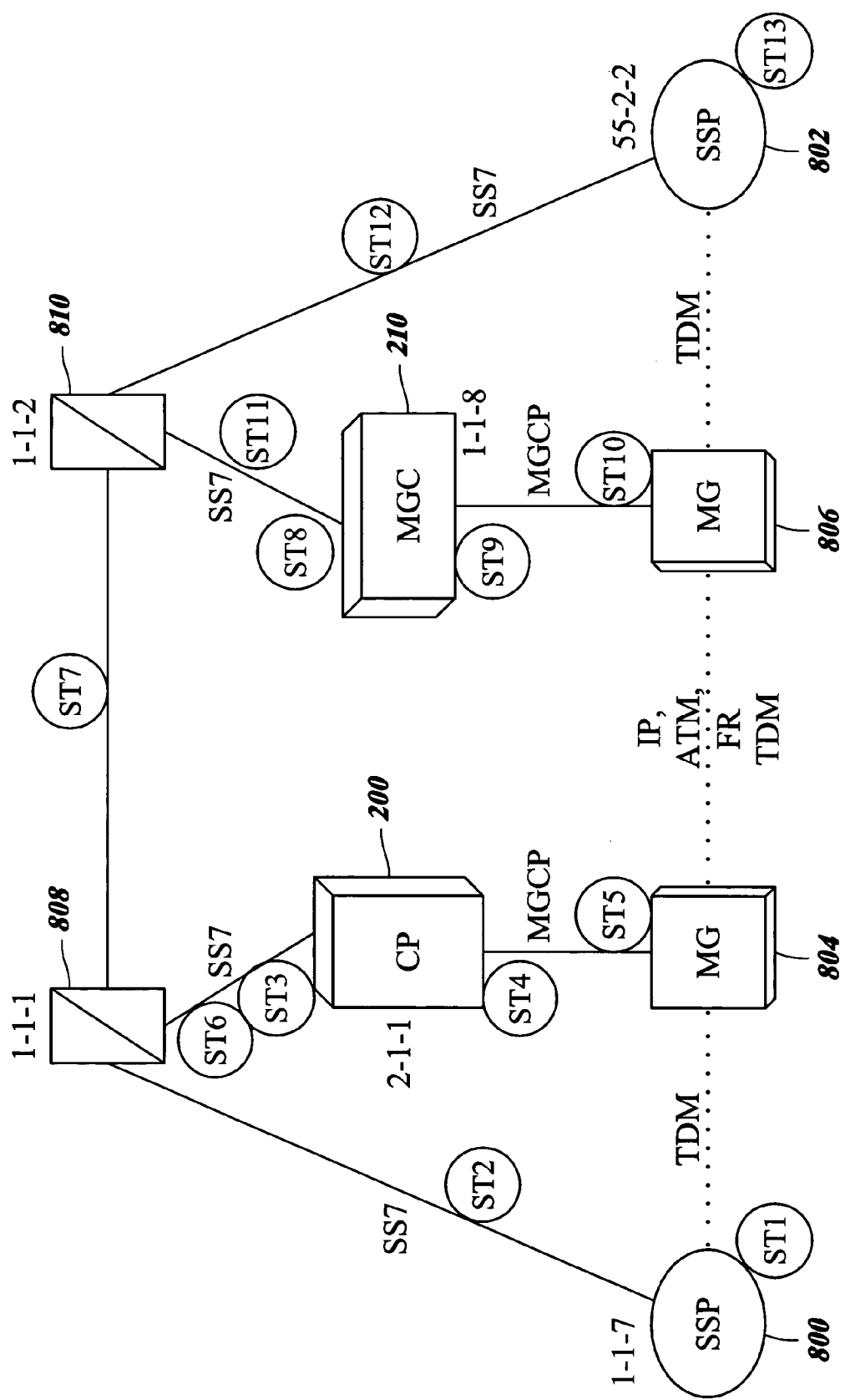
FIG. 11 is a block diagram of a telecommunications network including a scalable call processing node according to an embodiment of the present invention.

FIG. 11 is a network diagram illustrating call setup using scalable call processing node 200 and a media gateway controller 210 according to an embodiment of the present invention. In the example, steps for setting up a call between an end user associated with SSP 800 and an end user associated with SSP 802 will be described. The call is set up between media gateways 804 and 806. Call signaling messages for the call are routed through signal transfer points 808 and 810. The circled numerals in FIG. 11 refer to steps required for call setup which will now be described.

In step ST1, SSP 800 receives dialed digits from a calling party. In this example, it is assumed that the calling party number is 919-460-5500 and the called party is 219-884-8009. SSP 800 selects a trunk for voice communications by specifying circuit identification code of 50. SSP 800 then formulates and sends an IAM message to SSP 802 controlling the other end of the trunk. The OPC in such a message is 1-1-7, the DPC is 2-2-1, and the CIC is 50. In step ST2, the IAM message is sent to STP 808 for SS7 routing. STP 808 routes the IAM message to scalable call processing node 200. An HMRT process on the receiving LIM of scalable call processing node 200 selects a call server module and forwards the message to the selected call server module.

In step ST4, scalable call processing node 200 sends an MGCP CreateConnection request to MG 804 to set up an internal connection between incoming trunk from SSP 800 and the outgoing connection to media gateway 806. In this example, the outgoing connection to media gateway 806 may be IP, ATM, frame relay, TDM, or any other packet-based protocol for carrying the media stream between the called and calling parties. Media gateway 804 uses the information in the CreateConnection message to set up an internal connection between the TDM trunk connected to SSP 800 and the IP "trunk" connected to MG 806. In step ST5, media gateway 804 sends a response to scalable call processing node 200 indicating that the CreateConnection operation was successfully performed. In step ST6, scalable call processing node 200 formulates a new IAM message directed to MGC 240 having the point code 1-1-8. In step ST7, STP 808 forwards the new IAM message through the network. In step ST8, MGC 210 receives the IAM message from its SS7 stack. In step ST9, MGC 210 generates a CreateConnection message requesting MG 806 to set up an internal connection between two trunks, the incoming trunk from media gateway 804 and the outgoing trunk to SSP 802. In response to the CreateConnection message, media gateway 806 performs the steps necessary to set up the internal connection between the IP trunk connected to MG 804 and the TDM link to SSP 802. In step ST10, MG 806 acknowledges to the CreateConnection message.

In response to the CreateConnection acknowledgement message, in step ST11, MGC 210 formulates a new IAM message and sends the new IAM message to SSP 802 having the point code 55-2-2 so that SSP 802 will set up the trunk. In step ST12, STP 810 forwards the IAM message to SSP 802. In step ST13, SSP 802 completes the trunk setup operation.

At this point in the call, SSP 802 sends an ACM message to SSP 800. In response to the ACM message, SSP 800 applies a ring-back message to the calling party and SSP 802 applies a ringing signal to the called party. When the called party answers the call, an ANM message is forwarded by SSP 802 to SSP 800. Thus, FIG. 8 illustrates call setup using a scalable call processing node according to an embodiment of the present invention.

Call Setup Using SIP

Figure 12:
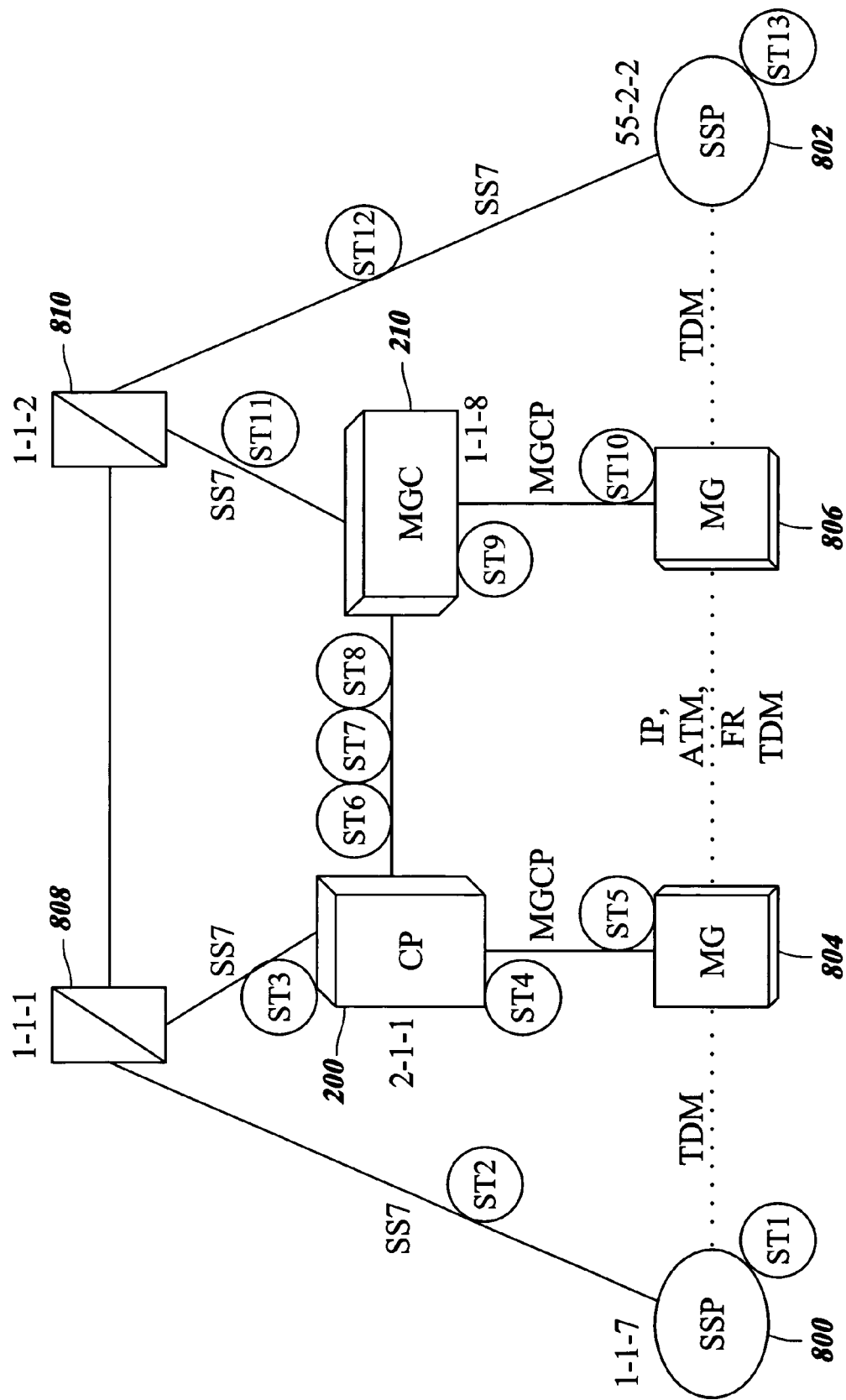
FIG. 12 is a block diagram of a telecommunications network including a call server module according to an alternative embodiment of the present invention.

FIG. 12 is a network diagram with identical entities to the network illustrated in FIG. 11. However, in FIG. 12, scalable call processing node 200 and MGC 210 exchange trunk setup messages using SIP rather than sending ISUP SS7 messages to each other through STPs 808 and 810. The steps in FIG. 12 other than steps ST6, ST7, and ST8 are identical to those illustrated in FIG. 11. Hence, a description thereof will not be repeated herein. Referring to step ST6 in FIG. 12, scalable call processing node 200 formulates a SIP message and sends the SIP message to MGC 210. The SIP message may be an INVITE message. The SIP INVITE message includes the outgoing trunk. Steps ST7 and ST8 indicate additional SIP messages that may be exchanged between scalable call processing node 200 and MGC 210 in order to set up a call between the parties. An example of a SIP INVITE message that may be formulated by scalable call processing node 200 according to the present embodiment is as follows:

INVITE sip: 19197878009@southbell.com SIP/2.0
  From: sip: 19194605500@office.tekelec.com
    To: sip: 19197878009@southbell.com
Call-ID: SOUTH94738299197878009@southbell.com In response to the SIP message, MGC 210 generates the CreateConnection message requesting MG 806 to set up a trunk connecting point code 2-1-1 and point code 55-2-2. Thus, the embodiment in FIG. 12 illustrates call setup using SIP according to an embodiment of the present invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. A scalable call processing node comprising:
   (a) a link interface module (LIM) interfacing with SS7 signaling links, receiving SS7 call signaling messages and identifying an SS7 call signaling message relating to establishment of a call as requiring processing by a call server and selecting a call server for processing the SS7 call signaling message based on at least one parameter in the SS7 call signaling message;
   (b) a first call server module separate from the LIM, the first call server module receiving the SS7 call signaling message from the LIM, the first call server module storing connection status and call state information regarding calls in progress in a media gateway and performing media gateway call management functions for establishing the call in the media gateway, thereby functioning as a primary call server; and
   (c) a second call server module separate from the LIM, the second call server module storing the connection status and call state information regarding calls in progress through the media gateway and functioning as a backup call server, wherein the second call server module switches operation to become the primary call server for the call in response to failure of the first call server module.

2. The scalable call processing node of claim 1 wherein the switching from backup to primary call server module occurs in less than one second.

3. The scalable call processing node of claim 1 wherein the switching occurs without transfer of the call state information from the first call server module to the second call server module.

4. The scalable call processing node of claim 1 wherein the call state and connection status information includes at least one call table storing call-related information.

5. The scalable call processing node of claim 4 wherein the at least one call table includes an endpoint table storing endpoint information for the media gateway.

6. The scalable call processing node of claim 5 wherein the at least one call table includes a connection table storing connection information for connections in the media gateway.

7. The scalable call processing node of claim 5 wherein the at least one call table includes a state table storing call signaling state information for endpoints in the media gateway.

8. The scalable call processing node of claim 1 wherein the link interface module and the first and second call server modules each comprise printed circuit boards having an application processor and a communication processor mounted thereon, the printed circuit boards being connected to a common bus and communicating with each other via the bus, thereby allowing subsecond switchover between the first and second call server modules.

9. The scalable call processing node of claim 1 comprising a transporter module operatively associated with the primary call server module, the transporter module generating a media gateway control command and forwarding the media gateway control command to the media gateway for setting up the call in the media gateway.

10. The scalable call processing node of claim 1 wherein performing media gateway call management functions includes selecting endpoints in the media gateway for the call.

11. A method for performing call server module switchover in a scalable call processing node in response to call server module failure, the method comprising:
   (a) providing a link interface module (LIM) interfacing with SS7 signaling links, receiving SS7 call signaling messages and identifying an SS7 call signaling message relating to establishment of a call as requiring processing by a call server and selecting a call server for processing the SS7 call signaling message based on at least one parameter in the SS7 call signaling message
   (b) operating a first call server module separate from the link interface module in a primary call server mode and operating a second call server module separate from the link interface module in a backup call server mode, wherein operating the first call server in the primary call server mode includes storing call state and connection status information regarding calls in progress in a media gateway and performing media gateway call management functions for establishing a call in the media gateway;
   (c) replicating the media gateway call state and connection status information regarding calls in progress through the media gateway to the second call server module;
   (d) detecting failure of the first call server module; and
   (e) in response to failure of the first call server module, switching the second call server module to operate in the primary call server mode.

12. The method of claim 11 wherein storing call state information includes storing parameters extracted from a sequence of ISUP messages required to set up or tear down a call.

13. The method of claim 11 wherein operating in the primary call server mode includes formulating instructions for setting up or tearing down the call and forwarding the instructions to a transporter module for translation and transport to the media gateway.

14. The method of claim 11 wherein operating in the backup call server mode includes storing the media gateway call state and connection status information without forwarding call processing messages to intended destinations.

15. The method of claim 11 wherein switching operation of the second call server module to the primary call server mode includes switching the operation within a fraction of one second.

16. The method of claim 11 wherein replicating the media gateway call state and connection status information to the second call server module includes sending the media gateway call state and connection status information from the first call server module to the second call server module via a common bus interconnecting the first and second call server modules.

17. The method of claim 11 comprising generating media gateway control commands based on the information selected by the first call server module and forwarding the media gateway control commands to the media gateway.

18. The method of claim 11 wherein performing media gateway call management functions includes selecting endpoints in the media gateway for the call.

* * * * *